(12) United States Patent
Hsu

(10) Patent No.: US 8,347,369 B2
(45) Date of Patent: Jan. 1, 2013

(54) SYSTEM AND METHOD FOR COMMUNICATION SECURITY

(75) Inventor: Chun-Wei Hsu, Tu-Cheng (TW)

(73) Assignee: Chi Mei Communication Systems, Inc., New Taipei (TW)

( * ) Notice: Subject to any disclaimer, the term of this patent is extended or adjusted under 35 U.S.C. 154(b) by 330 days.

(21) Appl. No.: 12/732,212

(22) Filed: Mar. 26, 2010

(65) Prior Publication Data

US 2011/0154453 A1     Jun. 23, 2011

(51) Int. Cl.
*G06F 7/04* (2006.01)
(52) U.S. Cl. ................................. 726/7; 726/5
(58) Field of Classification Search .............. 726/5, 7
See application file for complete search history.

(56) References Cited

U.S. PATENT DOCUMENTS

| | | | | |
|---|---|---|---|---|
| 4,411,017 A | * | 10/1983 | Talbot | 380/31 |
| 2009/0287922 A1 | * | 11/2009 | Herwono et al. | 713/155 |

* cited by examiner

*Primary Examiner* — Cordelia Zecher
(74) *Attorney, Agent, or Firm* — Altis Law Group, Inc.

(57) ABSTRACT

A system and method for communication security receives a request from a first communication device for communication with a second communication device, and determines if the communication is to be secure. The system and method further requests identity verification from the second communication device if the communication is to be secure. In addition, the system and method establishes a secure communication between the first communication device and the second communication device when a valid password is received from the second communication device.

14 Claims, 3 Drawing Sheets

SYSTEM AND METHOD FOR COMMUNICATION SECURITY

BACKGROUND

1. Technical Field

Embodiments of the present disclosure relate generally to communication devices, and more particularly to a system and method for communication security.

2. Description of Related Art

As use of wireless communication devices increases, privacy concerns become critical. However, a person may unknowingly leak his/her privacy information while he/she communicates with another person by a communication device, because the caller may misunderstand the authentic identity of the person who he/she communicates with.

Therefore, there is a need for an improved system and method to address the above-mentioned problems.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
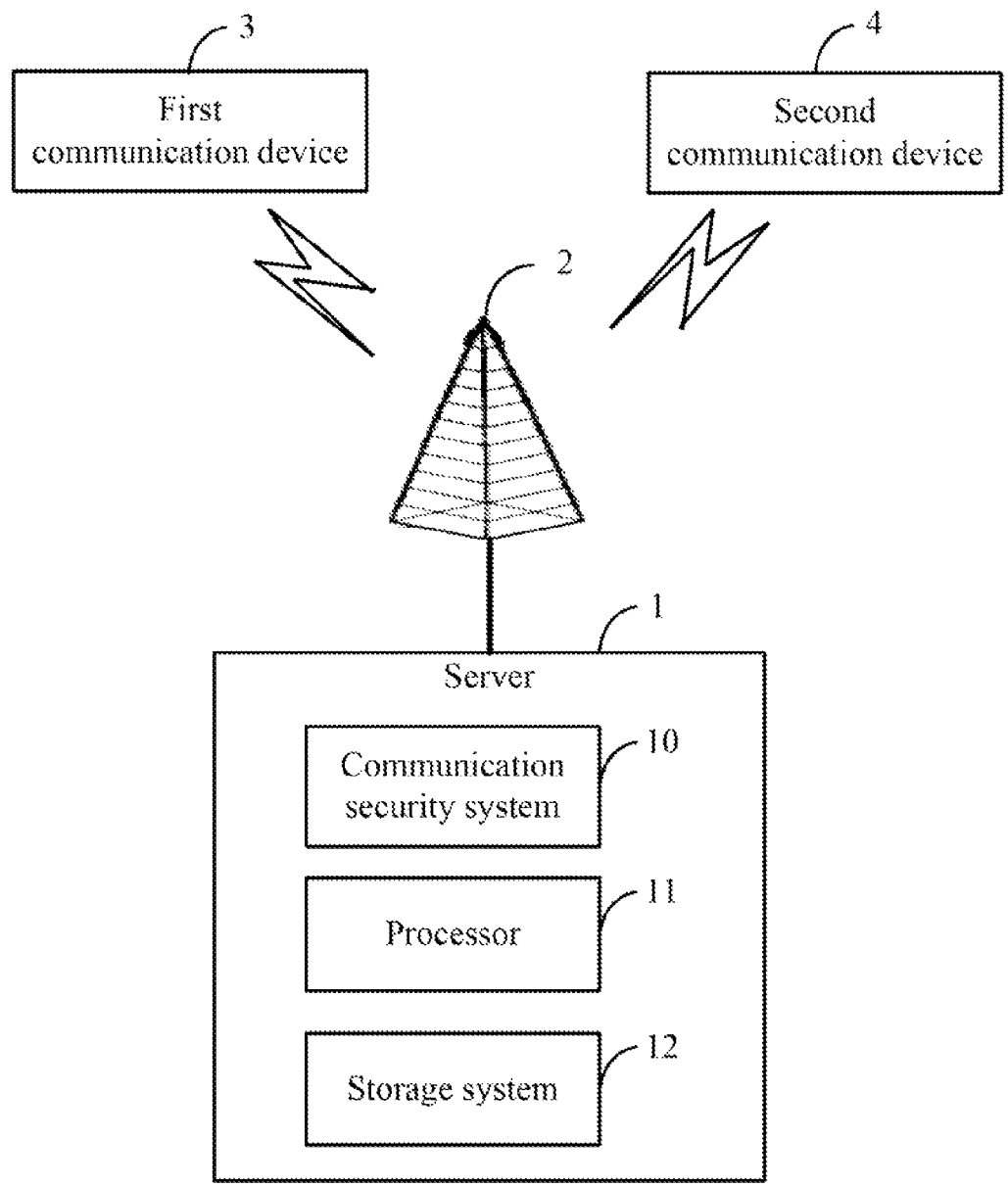
FIG. 1 is a block diagram of an embodiment of a server 1 comprising a communication security system 10.

FIG. 1 is a block diagram of one embodiment of a server 1 comprising a communication security system 10. In the embodiment, the server 1 communicates with a first communication device 3 and a second communication device 4 through a base station 2. The communication security system 10 secures communications between the first communication device 3 and the second communication device 4. In one embodiment, the base station 2 may be, for example, a wireless base station or a mobile telephone base station. The base station 2 emits radio signals periodically. Both the first communication device 3 and the second communication device 4 can send communication requests to the server 1 through the base station 2 to establish a communication between the first communication device 3 and the second communication device 4. In detail, the first communication device 3 may send a communication request to the server 1 for communication with the second communication device 4. The first communication device 3 and the second communication device 4 may be, for example, mobile phones, personal digital assistants (PDAs), or other computing devices.

In the embodiment, the server 1 may further include a processor 11, and a storage system 12. In one exemplary embodiment, one or more computerized codes of the communication security system 10 can be stored in the storage system 12 or a computer readable medium of the server 1. In another embodiment, the communication security system 10 may be included in an operating system of the server 1, such as the Unix, Linux, Windows 95, 98, NT, 2000, XP, an embedded operating system, or any other compatible operating system.

The processor 11 executes a plurality of computerized operations of the server 1 and other applications, to provide communication functions of the server 1. The storage system 12 stores one or more programs, such as an operating system, other applications of the server 1, and identification information of the first communication device 3 and the second communication device 4. The identification information may comprise a preset password and a phone number, or the preset password and an international mobile subscriber identity (IMSI) of the first communication device 3 or the second communication device 4. The preset password may be, for example, a plurality of numbers or a user biometric. In one embodiment, the storage system 12 may be a random access memory (RAM) for temporary storage of information, and/or a read only memory (ROM) for permanent storage of information. In other embodiments, the storage system 12 may also be an external storage device, such as a hard disk, a storage card, or a data storage medium.

Figure 2:
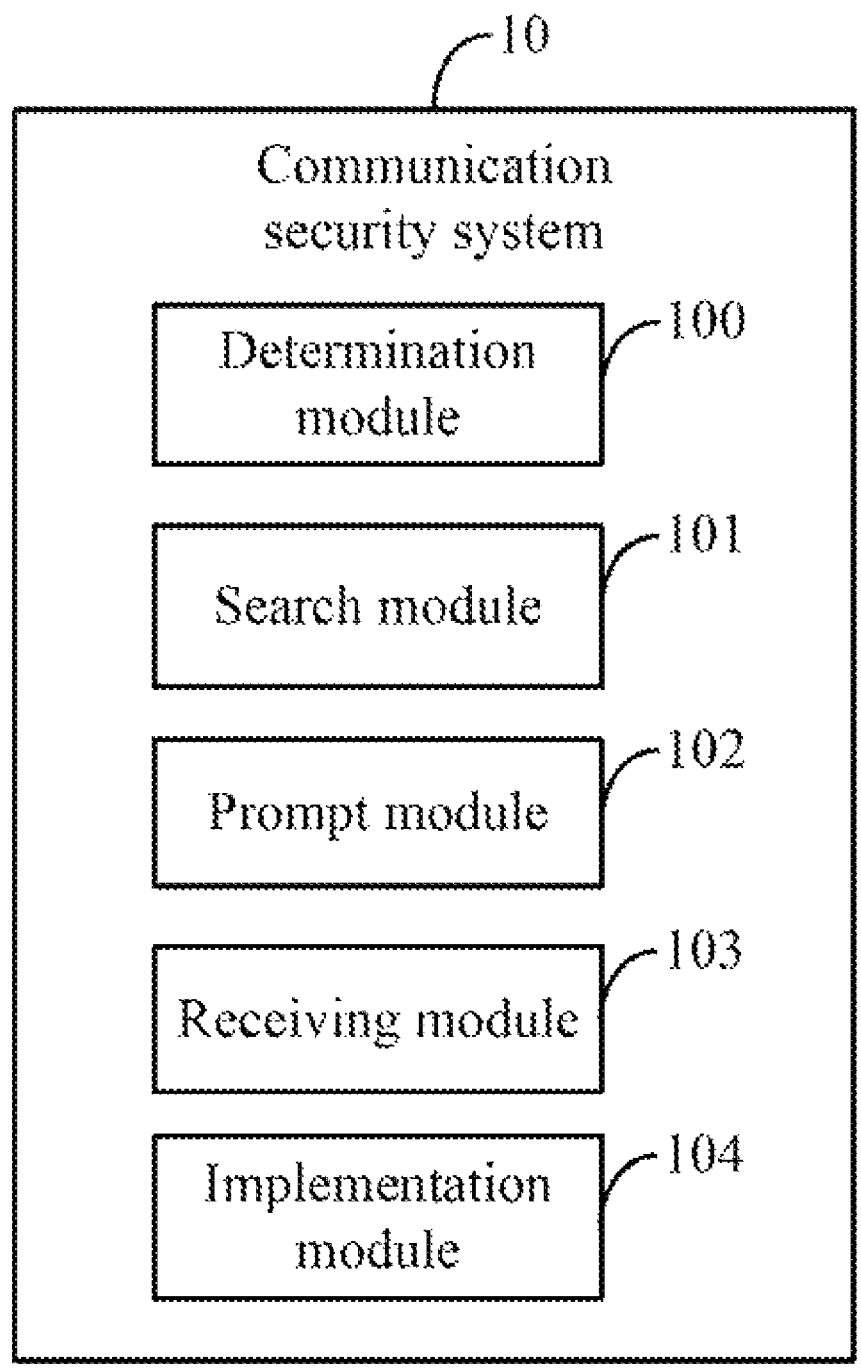
FIG. 2 is a block diagram of functional modules of the communication security system in FIG. 1.

FIG. 2 is a block diagram of one embodiment of functional modules of the communication security system 10 of FIG. 1. In the embodiment, the communication security system 10 includes a determination module 100, a search module 101, a prompt module 102, a receiving module 103, and an implementation module 104. The modules 100-104 may comprise a plurality of computerized operations to be executed by the processor 11 to perform a plurality of operations of the server 1. In general, the word "module," as used herein, refers to logic embodied in hardware or firmware, or to a collection of software instructions, written in a programming language, such as, Java, C, or Assembly. One or more software instructions in the modules may be embedded in firmware, such as an EPROM. The modules described herein may be implemented as either software and/or hardware modules and may be stored in any type of computer-readable medium or other storage device.

The determination module 100 receives a request from the first communication device 3 for communication with the second communication device 4, and determines whether the request is for a secure communication between the first communication device 3 and the second communication device 4. For example, the first communication device 3 may append an additional digit or digits, such as "10" to the entered phone number of second communication device 4. As such, the determination module 100 is thus notified that the communication is for a secure communication.

In response to the request for the secure communication, the search module 101 searches the storage system 12 for identification information of the second communication device 4.

The prompt module 102 requests identity verification from the second communication device 4 in a first prompt mode, if identification of the second communication device 4 is located in the storage system 12. The first prompt mode may be a voice message such as "Enter a password, please."

If no identification of the second communication device 4 is located in the storage system 12, the prompt module 102 notifies the first communication device 3 that the second communication device 4 does not support the secure communication in a second prompt mode. The second prompt mode may also be a voice message such as "Sorry, the called party does not support secure communication."

The receiving module 103 receives a password from the second communication device 4, and determines if the received password is valid. In one embodiment, the receiving module 103 compares the received password with a preset password of the second communication device 4. The receiving module 103 determines whether the received password is valid.

If the received password is valid, the implementation module 104 establishes the secure communication between the first communication device 3 and the second communication device 4, or a standard communication if no secure communication request has been submitted.

If the received password is not valid, the prompt module 102 notifies the first communication device 3 and the second communication device 4 that identity verification has failed.

The receiving module 103 stores the received identification information from the first communication device 3 or the second communication device 4 into the storage system 12.

Figure 3:
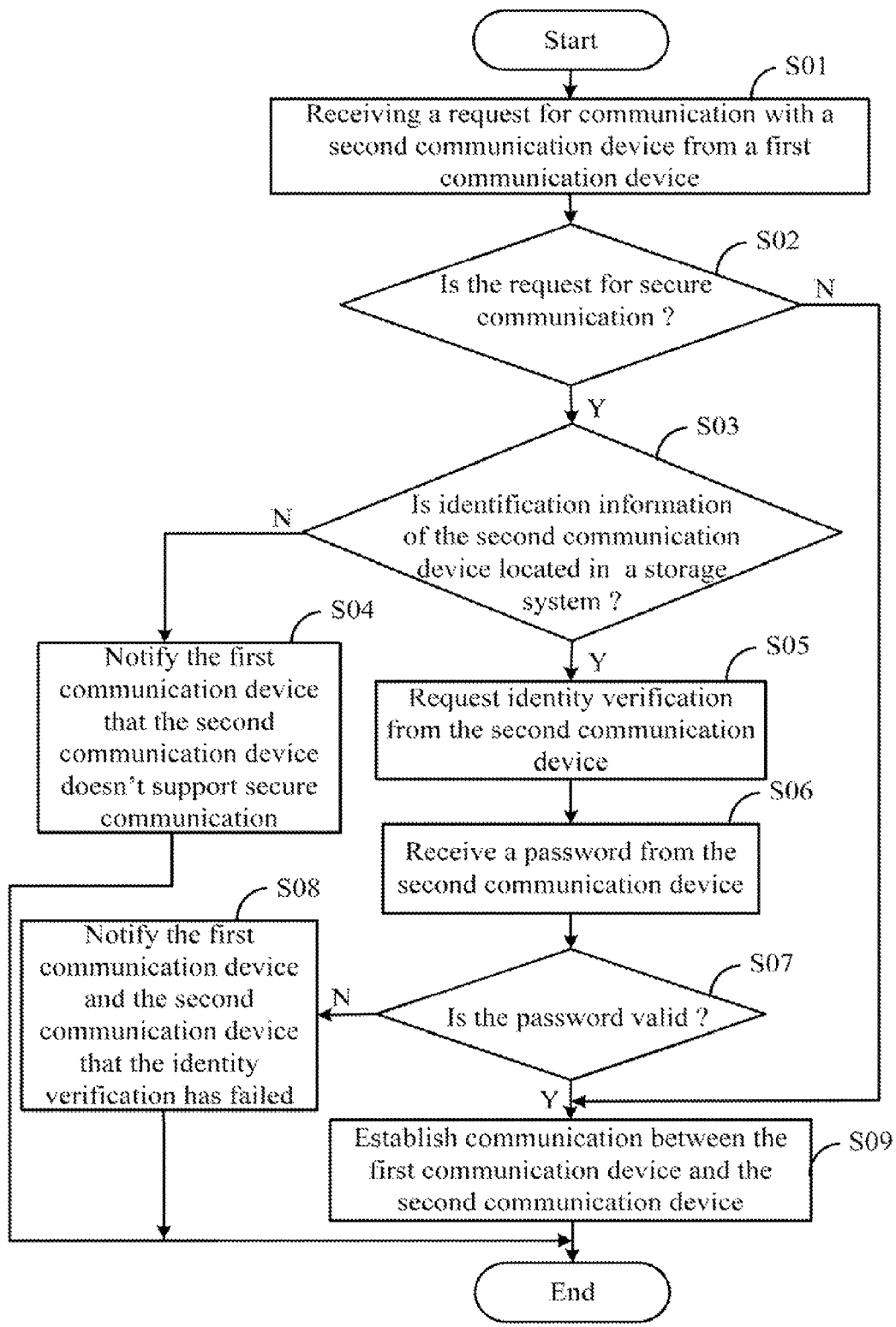
FIG. 3 is a flowchart of an embodiment of a method for communication security performed by a system, for example, that of FIG. 1.

FIG. 3 is a flowchart of an embodiment of a method for communication security, such as, for example, between the first communication device 3 and the second communication device 4 of FIG. 1. Depending on the embodiment, additional blocks may be added, others removed, and the ordering of the blocks in FIG. 3 may be changed.

In block S01, the determination module 100 receives a request from the first communication device 3 for communication with the second communication device 4.

In block S02, the determination module 100 determines whether the request is for a secure communication between the first communication device 3 and the second communication device 4. In response to the request for the secure communication, block S03 is implemented. If the request is not for the secure communication, block S09 is implemented.

In block S03, the search module 101 searches the storage system 12 for identification information of the second communication device 4.

If no identification information of the second communication device 4 is located in the storage system 12, in block S04, the prompt module 102 notifies the first communication device 3 that the second communication device 4 does not support the secure communication, and the procedure ends.

If identification information of the second communication device 4 is located in the storage system 12, in block S05, the prompt module 102 notifies the second communication device 4 of identity verification in a prompt mode. In one embodiment, the prompt mode may be a voice message such as "Enter a password, please."

In block S06, the receiving module 103 receives a password from the first communication device 3. In block S07, the receiving module 103 determines if the received password is valid. If the received password is valid, block S09 is implemented. If the received password is not valid, in block S08, the prompt module 102 notifies the first communication device 3 and the second communication device 4 that the identity verification has failed, and the procedure ends.

In block S09, the implementation module 104 establishes the secure communication between the first communication device 3 and the second communication device 4. As described in block S02, if the request is not for the secure communication, the implementation module 104 establishes a standard communication between the first communication device 3 and the second communication device 4.

In addition to the blocks disclosed, the receiving module 103 stores received identification information from the first communication device 3 or the second communication device 4 into the storage system 12.

Although certain inventive embodiments of the present disclosure have been specifically described, the present disclosure is not to be construed as limited thereto. Various changes or modifications may be made to the present disclosure without departing from the scope and spirit of the present disclosure.

What is claimed is:

1. A communication security computer-based method, the method comprising:
   receiving a request from a first communication device for communication with a second communication device;
   determining whether the request is for a secure communication between the first communication device and the second communication device;
   in response to the request for the secure communication, searching a storage system for identification information of the second communication device, the identification information comprising a preset password and an international mobile subscriber identity of the second communication device;
   if no identification information of the second communication device is located in the storage system, notifying the first communication device that the second communication device does not support the secure communication;
   if the identification information of the second communication device is located in the storage system, requesting identity verification from the second communication device;
   receiving a password from the second communication device, and determining if the received password is valid; and
   notifying the first communication device and the second communication that the identity verification has failed if the received password is not valid; or
   establishing the secure communication between the first communication device and the second communication device if the received password is valid.

2. The method according to claim 1, further comprising:
   receiving the identification information of the first communication device or the second communication device; and
   storing the received identification information into the storage system.

3. The method according to claim 2, wherein the identification information comprises a preset password and a phone number of the first communication device or the second communication device.

4. The method according to claim 1, further comprising:
   establishing a standard communication between the first communication device and the second communication device when the request is for non-secure communication.

5. The method according to claim 1, wherein the request is a phone number of the second communication device appended with an additional digit or digits.

6. A communication security system, comprising:
   a storage system;
   at least one processor; and
   one or more programs stored in the storage system and executable by the at least one processor, the one or more programs comprising:
   a determination module operable to receive a request from a first communication device for communication with a second communication device, and determine whether the request is for a secure communication between the first communication device and the second communication device;
   a search module operable to search a storage system for identification information of the second communication device in response to the request for the secure communication, the identification information comprising a preset password and an international mobile subscriber identity of the second communication device;

a prompt module operable to request identity verification from the second communication device if the identification information of the second communication device is located in the storage system, or notify the first communication device that the second communication device does not support the secure communication if no identification information of the second communication device is located in the storage system;

a receiving module operable to receive a password from the second communication device, and determine if the received password is valid; and an implementation module operable to establish the secure communication between the first communication device and the second communication device if the received password is valid; or the prompt module further operable to notify the first communication device and the second communication device that the identity verification has failed.

7. The system according to claim 6, wherein the receiving module is further operable to store received identification information from the first communication device or the second communication device into the storage system.

8. The system according to claim 7, wherein the identification information comprises a preset password and a phone number of the first communication device or the second communication device.

9. The system according to claim 6, wherein the request is a phone number of the second communication device appended with an additional digit or digits.

10. A non-transitory storage medium storing a set of instructions, the set of instructions capable of executed by a processor of a server, to perform a communication security computer-based method, the method comprising:

receiving a request from a first communication device for communication with a second communication device;

determining whether the request is for a secure communication between the first communication device and the second communication device;

in response to the request for the secure communication, searching a storage system for identification information of the second communication device, the identification information comprising a preset password and an international mobile subscriber identity of the second communication device;

if no identification information of the second communication device is located in the storage system, notifying the first communication device that the second communication device does not support the secure communication;

if the identification information of the second communication device is located in the storage system, requesting identity verification from the second communication device;

receiving a password from the second communication device, and determining if the received password is valid; and notifying the first communication device and the second communication that the identity verification has failed if the received password is not valid; or establishing the secure communication between the first communication device and the second communication device if the received password is valid.

11. The non-transitory storage medium as claimed in claim 10, wherein the method further comprises:

receiving the identification information of the first communication device or the second communication device; and storing the identification information into the storage system.

12. The non-transitory storage medium as claimed in claim 11, wherein the identification information comprises a preset password and a phone number of the first communication device or the second communication device.

13. The non-transitory storage medium as claimed in claim 10, wherein the method further comprises:

establishing a standard communication between the first communication device and the second communication device when the request is for non-secure communication.

14. The non-transitory storage medium as claimed in claim 10, wherein the request is a phone number of the second communication device appended with an additional digit or digits.

* * * * *

UNITED STATES PATENT AND TRADEMARK OFFICE
CERTIFICATE OF CORRECTION

PATENT NO. : 8,347,369 B2  
APPLICATION NO. : 12/732212  
DATED : January 1, 2013  
INVENTOR(S) : Hsu Page 1 of 1

It is certified that error appears in the above-identified patent and that said Letters Patent is hereby corrected as shown below:

Please replace Section (30) regarding "Foreign Application Priority Data" on the title page of the Patent with the following:

(30)   Foreign Application Priority Data

December 17, 2009   (CN) ........................2009 1 0311735

Signed and Sealed this  
Fifteenth Day of October, 2013

Teresa Stanek Rea  
*Deputy Director of the United States Patent and Trademark Office*